Nov. 25, 1952 — W. L. MORRISON — 2,618,939
METHOD OF FREEZING FOOD
Filed Aug. 15, 1947 — 3 Sheets-Sheet 1
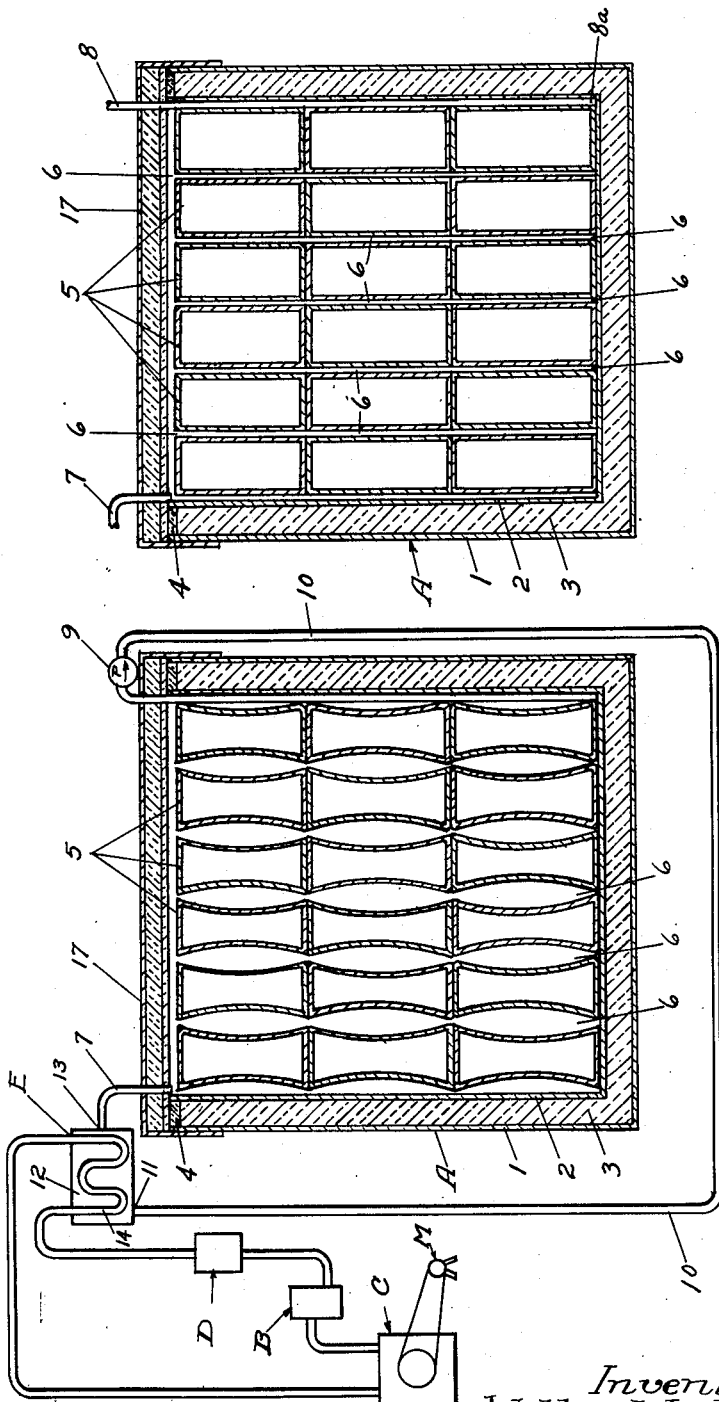
Inventor
Willard L. Morrison
by Parker & Carter
Attorneys

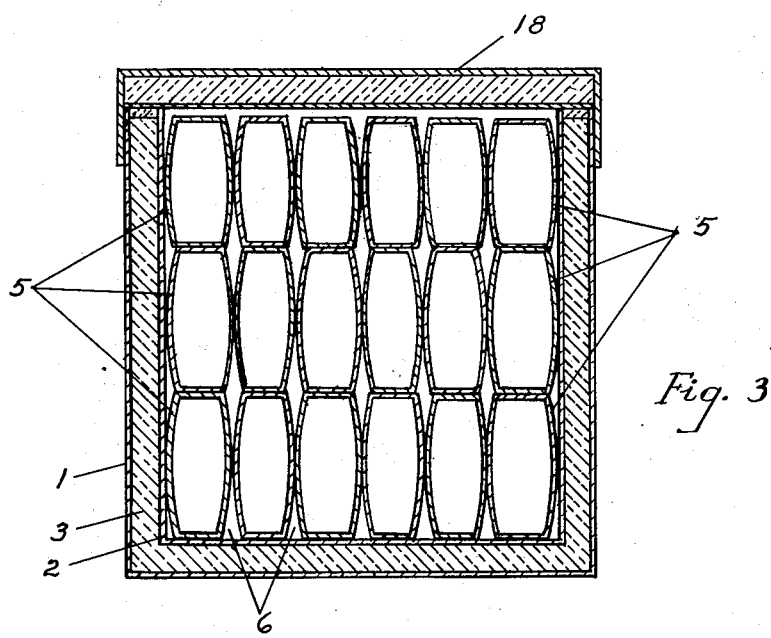
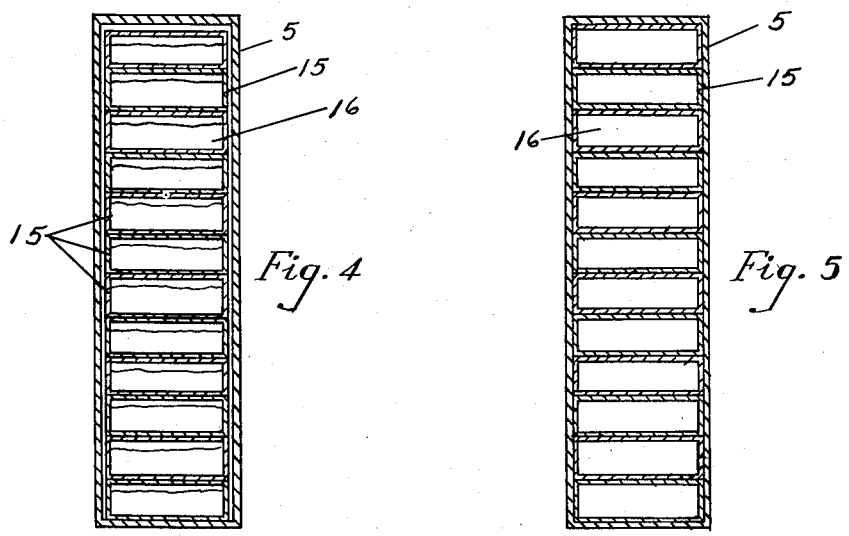

Patented Nov. 25, 1952

2,618,939

UNITED STATES PATENT OFFICE 2,618,939

METHOD OF FREEZING FOOD

Willard L. Morrison, Lake Forest, Ill.

Application August 15, 1947, Serial No. 768,833

5 Claims. (Cl. 62—173)

My invention relates to an improvement in the means for freezing food and has for one purpose a means for freezing food in the shipper.

Another purpose is to circulate a convection freezing liquid around the containers of food after they are loaded in the shipper container.

Another purpose is to provide a space for the food as it expands during freezing.

Another purpose is to provide a food container that will diffuse the heat within the shipper container.

Another purpose is to provide a tin container into which paper cartons of food can be packed for freezing.

Another purpose is to provide a food container that will respond to the hydrostatic pressure of the convection fluid and also to the expansion of the food.

Another purpose is to provide a means for freezing food in the shipper container.

Other purposes will appear from time to time in the course of the specification and claims.

My invention is illustrated more or less diagrammatically in the accompanying drawings, wherein:

Figure 1 is a vertical section of the shipper container filled with the heat conductive food containers, the inlet and outlet tubes in the shipper containers, and a temporary cover on the top before the convection fluid is supplied.

Figure 2 is a vertical section and refrigeration circuit showing the food containers somewhat collapsed due to the hydrostatic pressure of the convection fluid flowing around the containers.

Figure 3 is a vertical section of the shipper containers with the food containers in a slightly expanded condition due to the expansion of the frozen food.

Figure 4 is a section of a metallic food container showing the loosely packed food cartons and the partially filled food packages as they are before freezing begins.

Figure 5 is a section of the metal food container showing the tightly packed food and the tightly packed cartons in the container expanded as a result of freezing.

Like parts are indicated by like symbols throughout the specification and drawings.

Figure 6:
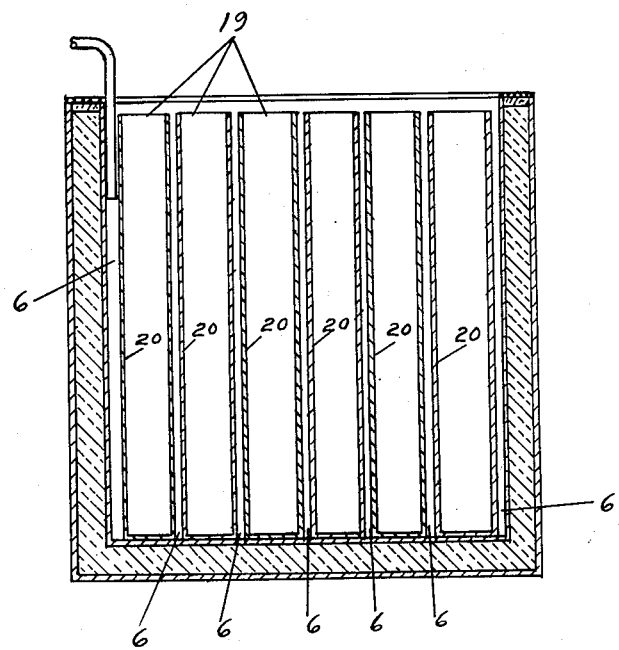
Figure 6 is a vertical section of a shipper with heat conducting containers that have open tops.

Referring to the drawings, I illustrate more or less diagrammatically a shipper container A consisting of an outer wall 1 and an inner wall 2 with insulation 3 between them. A connecting non-conductive band 4 forms the sealing member between the inner and outer wall at the top of the shipper container.

Inside the shipper are the thin metal food containers 5. Figure 1 illustrates the containers in position before the freezing takes place with the spaces 6 between the containers for the convective freezing fluid to circulate. The freezing fluid enters the shipper through the tube 7 and exists through the tube 8. The tube 8 extends to the bottom of the shipper from where it drains the fluid at 8a by means of a pump 9 which is placed outside the shipper. The fluid is then driven through return tube 10 to the entrance 11 of heat exchanger 12. This fluid is again cooled in the heat exchanger 12 by the cooling coils 14 of the refrigeration circuit.

The convective freezing fluid is cooled by a conventional refrigeration circuit consisting of a compressor C driven by a motor M. The refrigerant travels to condenser B where the gaseous refrigerant is condensed. It then is stored in a receiver D from where it feeds into the evaporator coils 14 of the heat exchanger E.

The convection fluid which has been cooled by this refrigeration circuit is then emitted at exit 13 and travels by gravity through the tube 7 to the inside of the shipper where it recirculates around the food containers 5.

The hydrostatic pressure of this convective cooling fluid causes the sides of the food containers to collapse slightly. Additional pressure may be added to the fluid so as to aid in depressing the containers. In Figure 2 this collapsing is illustrated in a somewhat exaggerated form. By this collapsing the metallic or heat conducting or heat diffusing container comes into tight contact with the food and the convective fluid is able to freeze the food more effectively. As crystallization takes places in the food a certain amount of expansion results. The flexibility of the food container responds to this expansion and in Figure 3 I illustrate the containers in a somewhat expanded condition. The spaces between the containers and the distortion of the containers is exaggerated for the purpose of illustrating the theory.

In Figure 4 I illustrate a metallic container loosely filled with cartons 15 of food. These cartons are only partially filled with the food 16. As the freezing takes place and the food expands, the space within the carton 15 is largely filled and the cartons expanded by the food 16, and the cartons snugly fill the space within the container 5.

In Figure 6 I illustrate an insulated shipper container with a variant form of metallic diffuser container. In this form the containers 20 extend the depth of the shipper and are open at the top 19. With this type of shipper a convective fluid such as liquid nitrogen can be injected in the shipper at a safe distance below the open top. This liquid circulates around the containers and eventually evaporates, thus eliminating the necessity of pumping the freezing fluid out of the shipper.

It is to be understood that the system illustrated in Figure 2 could also be applied to the form illustrated in Figure 6 by maintaining the level of the convective fluid below the open top containers.

The use and operation of my invention are as follows:

In the superchilling of food it would greatly facilitate the process if the freezing could be done in the shipper. It would further facilitate the process if a convective fluid could be circulated around the food containers in the shipper. By packing the food in thin metal containers or tote boxes hermetically sealed, this liquid can be circulated in the shipper without harming the food. Or in the open top type illustrated in Figure 6, the same action takes place except that the level of the convective fluid must be kept below the level of top of the box. The pressure of the fluid will cause the sides of the food container to be depressed until they contact the food. This contact speeds the freezing process and as crystallization takes place in the food the resulting expansion presses the containers outwardly until the containers contact each other. This contact aids heat diffusion within the shipper, thus effecting an even temperature throughout.

After freezing has been completed and the suction tube 8 has evacuated the freezing fluid from the shipper, the tube 8 is removed from the shipper. The temporary cover 17 is replaced by the permanent cover 18 shown in Figure 3.

Abutting faces of shipper and cover are covered with some thick piled material such as carpeting so as to prevent leakage of air.

After fastening the cover in place the shipper is ready to be shipped.

While in the drawings the collapsing and subsequent expansion of the diffuser tote boxes is exaggerated, it is a fact that when the food is frozen the tote boxes are in contact with one another and the cartons are squared up by their expansive contact with the substantially rectangular heat diffusing tote boxes.

I claim:

1. The method of preparing food for shipment which consists in loosely assembling in a metallic heat conducting and diffusing casing, a plurality of cartons, each loosely filled with food to be treated, permanently sealing each casing for storage and shipment, assembling a plurality of such casings loosely in an insulated freezing and shipping receptacle, freezing the food to cause the food to expand to generally fill each casing and to cause the casing to expand to hold them in conductive contact with one another.

2. The method of preparing food for shipment which consists in loosely assembling in a metallic heat conducting and diffusing casing, a mass of food insufficient to completely fill the casing for shipment and storage, permanently sealing the casing, then assembling a plurality of casings loosely in an insulated freezing and shipping receptacle, then freezing the food to cause it to expand, fill the casings and cause the casings to expand to hold them in conductive contact with one another.

3. The method of packing and preserving food which consists in assembling a plurality of separately wrapped packages of unfrozen food in a metallic, flexible walled tote box, sealing the box for shipment and storage, then circulating a freezing fluid about the entire outer periphery thereof, while subjecting it to the hydrostatic pressure of the fluid to collapse the walls thereof against the food packages, continuing the circulation of the freezing fluid and the application of hydrostatic pressure until the contents of the box are frozen and the frozen food has expanded against the walls of the tote box to overcome the collapse thereof responsive to hydrostatic pressure.

4. The method of packing and preserving food which consists in assembling a plurality of separately wrapped packages of unfrozen food in a metallic, flexible walled tote box, sealing the box for shipment and storage, then placing a plurality of such boxes in a freezing and shipping member of fixed dimensions such that the tote boxes are loosely enclosed within the shipping member, then filling the member with freezing fluid and circulating the freezing fluid through the member about the entire outer peripheries of the boxes, while subjecting them to the hydrostatic pressure of the fluid to collapse the walls thereof against the food packages, continuing the circulation of the freezing liquid and the application of hydrostatic pressure until the contents of the boxes are frozen and the frozen food has expanded against the walls of the tote boxes to overcome the collapse thereof responsive to hydrostatic pressure, and to expand them into closer contact with one another and with the outer periphery of the member.

5. The method of packing and preserving food which consists in assembling a plurality of separately wrapped packages of unfrozen food in a conductive, flexible walled, sealed tote box, the volume of food in the tote box being such that when in unfrozen condition it does not quite fill the box, but when in frozen condition the expansion resultant from freezing is sufficient to exert an outward pressure on the walls of the tote box, assembling a plurality of such tote boxes in a freezing zone, the relative dimensions of the zone and tote box being such that when the contents of the box is unfrozen the boxes may collapse under hydrostatic pressure, then filling the zone with a freezing fluid, circulating the fluid therein to freeze the contents of the tote boxes to cause the contents to expand, and expand the tote boxes to bring them into conductive contact with each other, then withdrawing the freezing liquid from the zone and enclosing the tote boxes in said zone as a unit for shipment.

WILLARD L. MORRISON.

REFERENCES CITED

The following references are of record in the file of this patent:

UNITED STATES PATENTS

| Number | Name | Date |
|---|---|---|
| 1,511,824 | Birdseye | Oct. 14, 1924 |
| 1,925,454 | Meacham | Sept. 5, 1933 |
| 1,939,109 | Davidson | Dec. 12, 1933 |
| 1,965,624 | Young | July 10, 1934 |
| 1,983,768 | Norton | Dec. 11, 1934 |
| 2,260,450 | Guinane | Oct. 28, 1941 |
| 2,287,693 | McCann | June 23, 1942 |
| 2,350,883 | Duttweiler | June 6, 1944 |
| 2,403,030 | Solinsky | July 2, 1946 |
| 2,433,663 | Hanson | Dec. 30, 1947 |